United States Patent

Murono

[11] Patent Number: 5,815,500
[45] Date of Patent: Sep. 29, 1998

[54] NETWORK CONNECTION DEVICE

[75] Inventor: Takahiro Murono, Tokyo, Japan

[73] Assignee: Kabushiki Kaisha Toshiba, Kawasaki, Japan

[21] Appl. No.: 758,098

[22] Filed: Nov. 29, 1996

[30] Foreign Application Priority Data

Dec. 1, 1995 [JP] Japan .................................. 7-314071

[51] Int. Cl.$^6$ .................................................. H04L 12/46
[52] U.S. Cl. .......................................................... 370/401
[58] Field of Search ..................................... 370/401, 402, 370/403, 404, 405, 400, 412, 428, 429, 389, 392, 466, 467; 395/200.3, 200.68, 200.72, 200.79, 427, 435, 800.01, 800.25, 800.28, 800.3

[56] References Cited

U.S. PATENT DOCUMENTS

| | | | |
|---|---|---|---|
| 5,309,437 | 5/1994 | Perlman .................................. | 370/401 |
| 5,329,618 | 7/1994 | Moati et al. ............................ | 370/401 |
| 5,420,862 | 5/1995 | Perlman et al. ........................ | 370/401 |
| 5,555,405 | 9/1996 | Griesmer et al. ...................... | 370/401 |
| 5,581,559 | 12/1996 | Crayford et al. ....................... | 370/402 |
| 5,634,015 | 5/1997 | Chang et al. ........................... | 370/402 |
| 5,651,002 | 7/1997 | Van Seters et al. .................... | 370/401 |

*Primary Examiner*—Huy D. Vu
*Attorney, Agent, or Firm*—Oblon, Spivak, McClelland, Maier & Neustadt, P.C.

[57] ABSTRACT

A network connection device with improved processing speed for exchanging a frame including content addressable memories (CAMs), each having predetermined data stored in each of a plurality of entries in advance, for checking whether or not the predetermined data of each entry conforms to data of the frame transmitted from a sender network. The device also includes a table memory, provided to correspond to each entry of the CAM, for storing data of the other CAM to be searched next or an address of a destination sender network. The device further includes a data continuous search processing circuit for obtaining the address of the destination network of the frame from the sender network by use of data and the address stored in the table memory and a checking means when the CAM checks that the predetermined data conforms to data from the sender network, for setting the address of the frame from the sender network having the address of the frame from the sender network obtained, and for transmitting the frame having the address of the destination network set to the sender network. The checking means is continuously accessed based on data sent from the storing means, so that the address of the network can be obtained. The device achieves improved processing speed by use of the continuous search.

10 Claims, 10 Drawing Sheets

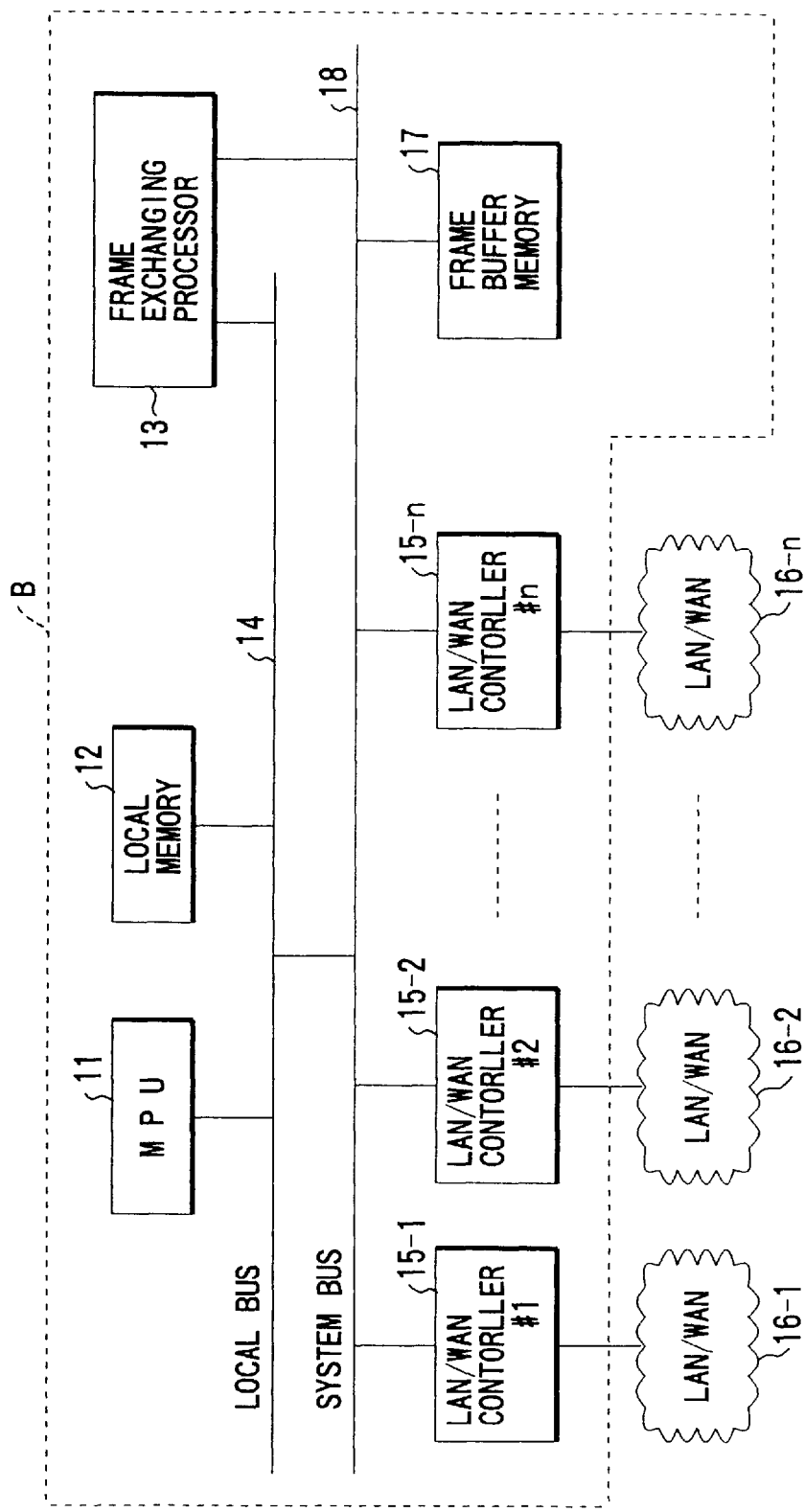
F I G. 4

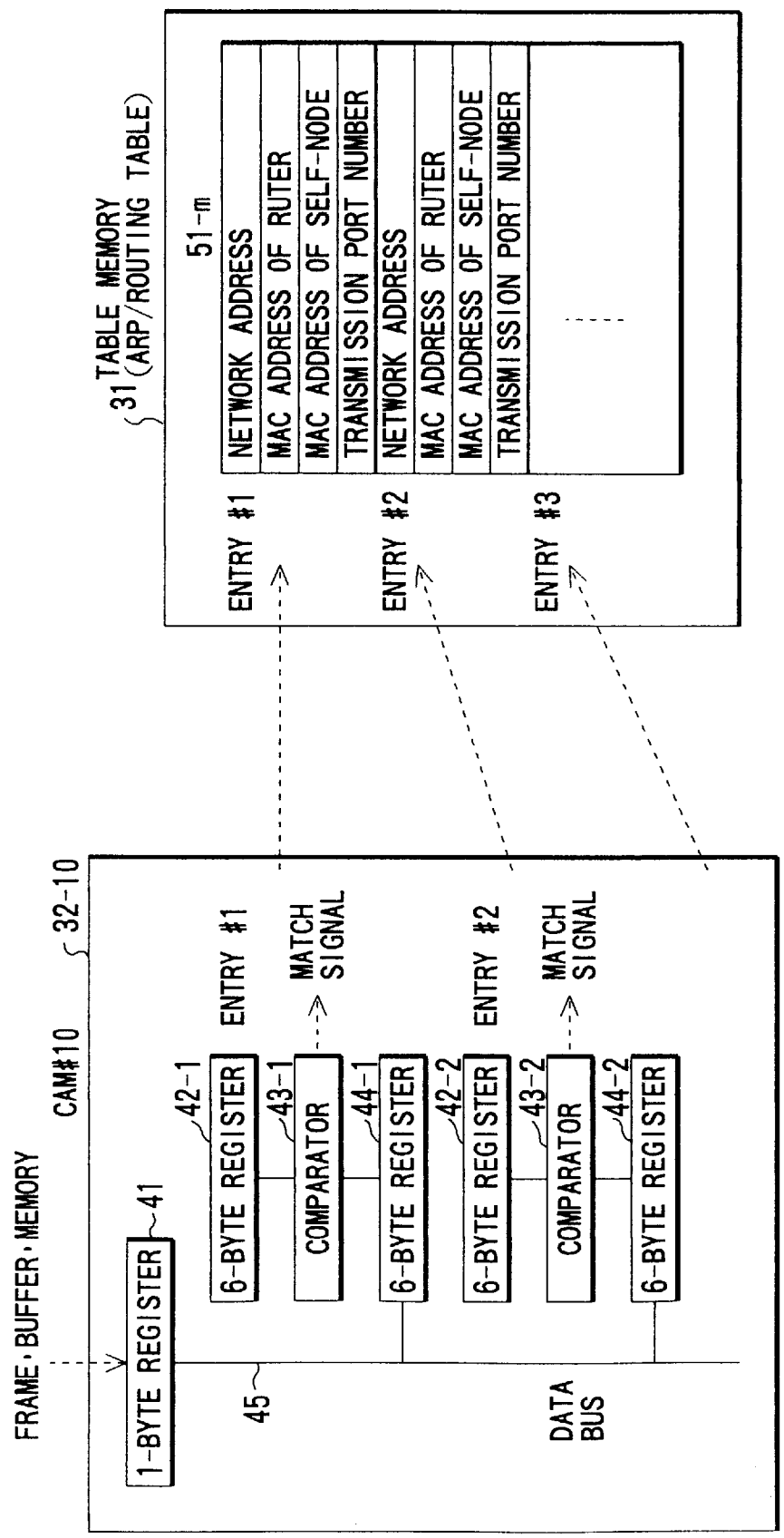
F I G. 7

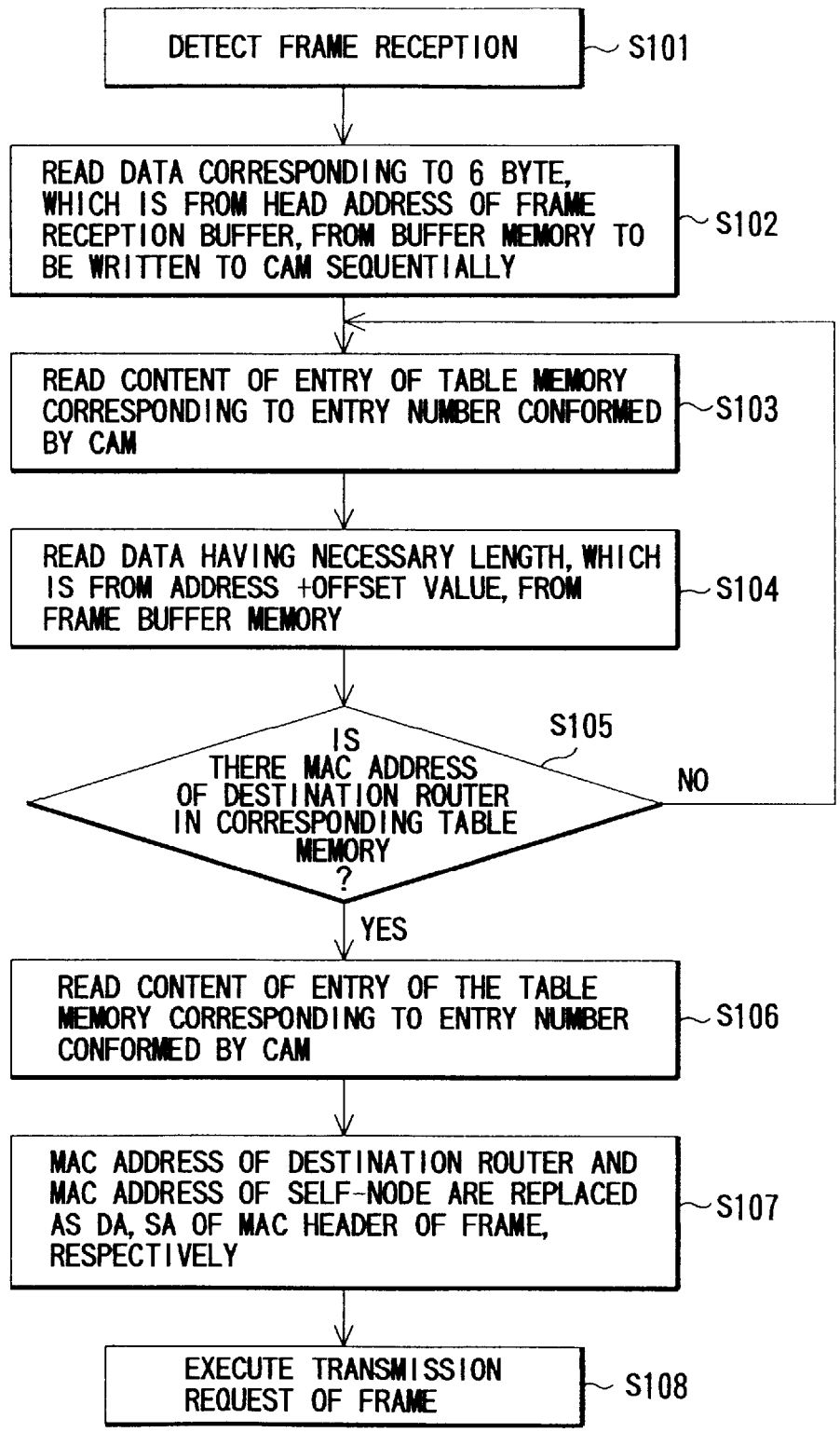
F I G. 8

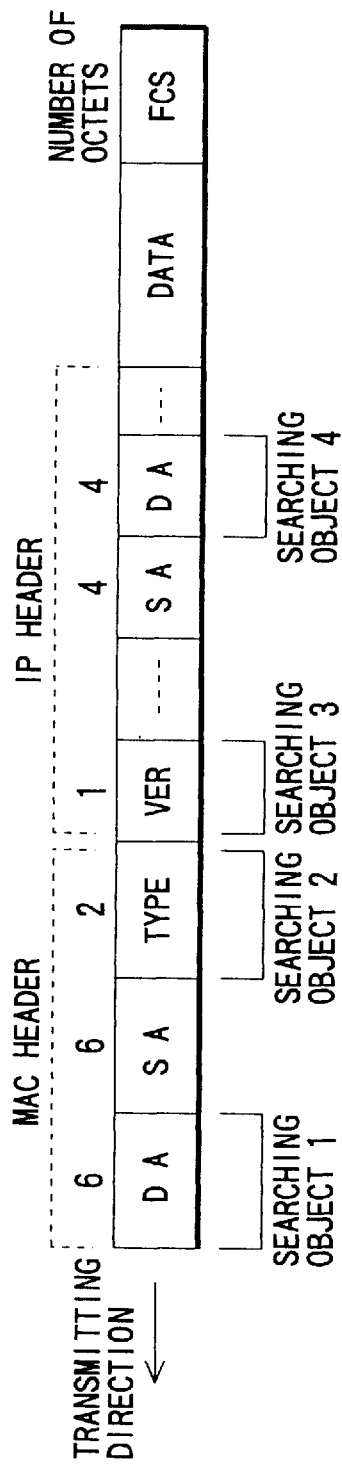
F I G. 9

NETWORK CONNECTION DEVICE

BACKGROUND OF THE INVENTION

1. Field of the Invention

The present invention relates to a network connection device for connecting a local area network (LAN) or a wide area network (WAN) to the other LANs or the other WANs to receive and transmit a frame.

2. Description of the Related Art

The conventional network connection device, which is called "bridge" or "router", was structured as shown in FIG. 1.

In this figure, a network connection device A comprises a microprocessor unit (MPU) 1, a local memory 2, LAN/WAN controllers 5-1 to 5-n, and a frame buffer memory 7. The network connection device A has a function as a router so as to form one station.

The LAN/WAN controllers 5-1 to 5-n are connected to a plurality of LAN/WAN 6-1 to 6-n, respectively. The LAN/WAN controllers 5-1 to 5-n are connected to the frame buffer memory 7 for storing frames through a system bus 8.

The frames coming from the LAN/WAN controllers 6-1 to 6-n are output to the system bus 8 through the LAN/WAN controllers 5-1 to 5-n, respectively, so as to be temporarily stored in the frame buffer memory 7. The frames stored in the frame buffer memory 7 are further read by MPU 1 connected to a local bus 4 so as to be transmitted to LAN/WAN 6-1 to 6-n (sender) through LAN/WAN 5-1 to 5-n.

MPU 1 is connected to the local bus 4. MPU 1 controls exchange of the frames, which are stored in the frame buffer memory 7, with use of a program and data stored in the local memory 2, which is connected to the local bus 4.

In the exchange control, MPU 1 compares a header portion of each of the frames, coming from LAN/WAN 6-1 to 6-n through LAN/WAN controllers 5-1 to 5-n, with data registered in advance. Based on the comparison result, the frame is canceled or transmitted to LAN/WAN 6-1 to 6-n (sender).

Regarding the exchange control, the following will explain an "IP router", which exchanges the frame between two networks.

Specifically, the frame coming from one network has a format as shown in FIG. 2. In other words, an IP header and a media access control (MAC) header are added to data. The IP header has a version (VER), a sender address (SA), and a destination address (DA). The MAC header has a destination address (DA), a sender address (SA), and a protocol type (TYPE). If the frame, which comes from the LAN/WAN 6 through the LAN/WAN controller 5, is stored in the frame buffer memory 7, MPU 1 executes the processing operation in accordance with a program of the flow chart of FIG. 3. Then, the following will explain a case in which the frame is transmitted from LAN/WAN-6-1 to LAN/WAN 6-2.

After the frame coming from the LAN/WAN 6-1 is stored in the frame buffer memory 7, the LAN/WAN controller 5-1 generates an interrupt of frame receiving to MPU1. When the interrupt from the controller 5-1 occurs in MPU 1 (S201), the destination address DA of the MAC header of the frame is fetched to check whether or not an address of a own-node address, which the network connection device A owns itself, is set (S202).

If the address of the own-node is not set, the other processing such as the cancellation of the frame is executed.

If the address of the own-node is set, the protocol type of the MAC header is fetched to check whether or not IP is shown (S203).

If the protocol type does not show IP, the other processing such as the cancellation of the frame is executed. If the protocol type shows IP, the version (VER) of the IP header of the frame is fetched to check whether or not the fetched version conforms to the version of the protocol (S204).

If the fetched version does not conform to the version of the protocol, the other processing such as the cancellation of the frame is executed. If the fetched version conforms to the version of the protocol, the destination address (DA) of the IP header is fetched to check whether or not the fetched destination address (DA) is the frame to the self-node (S205).

If the fetched destination address (DA) is the frame to the own-node, the other processing such as frame fetching is executed. If the fetched destination address (DA) is not the frame to the own-node, a MAC address to be following forwarded of an address router is searched from the destination address DA of the IP header with reference to a table (not shown), etc. (S206). Based on such a search, the destination address DA of the MAC header and the sender address SA are replaced (S207). Then, the frame is transmitted to LAN/WAN 6-2 from MPU 1 through LAN/WAN controller 5-1 (S208).

In the flow chart of FIG. 3, the processing for partially changing the IP header such as a time to live value, a checksum value, etc. is omitted.

The above-mentioned frame exchanging process is influenced by the performance of the processor. The above-mentioned search processing of frame data occupies most part of the frame exchanging process. Due to this, in the conventional case, a method such as "hash search" etc. is generally used to speed up the processing.

However, even if any method is used, the searching speed depends on the performance of the processor and the speed of the memory access since the search is executed by the program processing of the processor.

In recent years, FDDI of 100Mbps has been widely used, and the LAN system has been developed on a large scale. As a result, the speed of LAN is improved, and the number of networks to be connected is increased. However, as long as the performance of the processor is not improved, there is a bottleneck problem in the communication between LANS.

SUMMARY OF THE INVENTION

An object of the present invention is to provide a network connection device which can improve the velocity of processing with use of a relatively simple structure.

The other object of the present invention is to provide a network connection device which can deal with trouble of the network or the replacement of the structure even if the trouble and the replacement occur.

According to the first aspect of the present invention, there is provided a network connection device comprising:

checking means, each having predetermined data stored in each of a plurality of entries in advance, for checking whether or not the predetermined data of each entry is conformed to data of the frame transmitted from a sender network;

storing means, provided to correspond to each entry of the checking means, for storing data of the other checking means to be searched next or an address of a destination sender network;

address obtaining means for obtaining the address of the destination network of the frame from the sender network by use of data and the address stored in the storing means and the checking means when the checking means checks that the predetermined data is conformed to data from the sender network;

setting means for setting the address of the frame from the sender network in place of the address of the destination network obtained by the address obtaining means when the address obtaining obtains the address of the destination network; and transmitting means for transmitting the frame having the address of the destination network set by the setting means to the sender network.

According to the above-mentioned structure, if data of the frame is input from the network, the checking means compares the plurality of data stored in advance with data of the frame transmitted from the network. If the plurality of data stored in advance is conformed to data of the frame transmitted from the network, the address of the other checking means to be searched next or the address of the network can be obtained. In a case where the address of the network is obtained, the address is set in place of the address of the frame, so as to be transmitted to the corresponding network.

According to the second aspect of the present invention, in the network connection device of the first aspect, the checking means is continuously accessed based on data being stored in the storing means and showing the other checking means to be searched next, so that the address obtaining means obtains the address of the destination network stored in the storing means.

According to the above-mentioned structure, the checking means is continuously accessed based on data sent from the storing means, so that the address of the network can be obtained. As a result, the velocity of the processing can be improved by use of the continuous search.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiment of the present invention and, together with the general description given above and the detailed description of the preferred embodiment given below, serve to explain the principles of the present invention in which:

FIG. 4 is a view showing a network connection device of an embodiment of the present invention;

FIG. 7 is a view showing a table for storing data of addresses of the network of the memory for table;

FIG. 8 is a flow chart showing an operation of the frame exchanging processor of the network device of FIG. 5;

FIG. 9 is a view showing a frame stored in a frame buffer memory of the network connection device of FIG. 4.

DETAILED DESCRIPTION OF THE PREFERRED EMBODIMENTS

Figure 1:
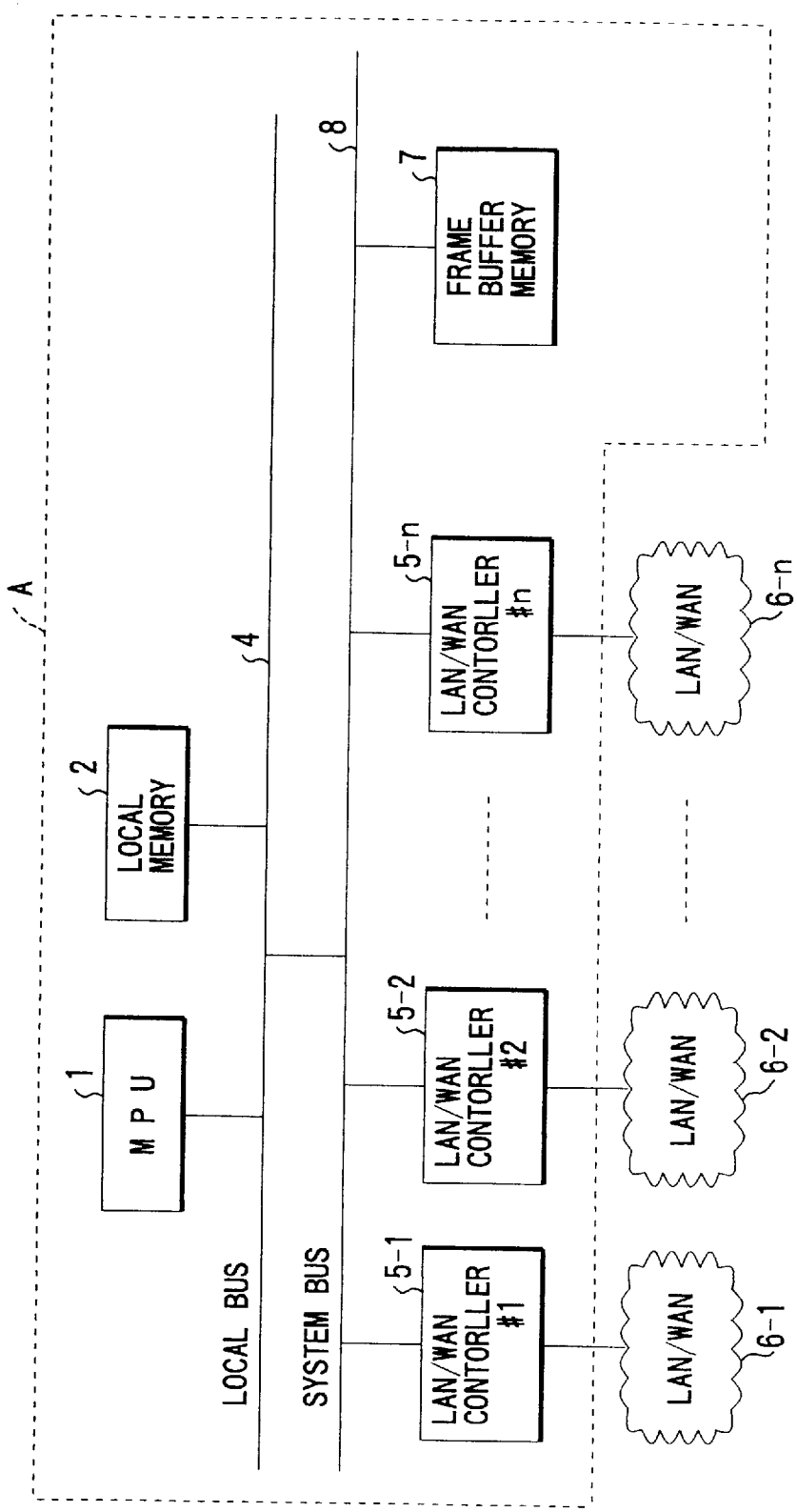
FIG. 1 is a block diagram showing the structure of a conventional network connection device.
Figure 2:
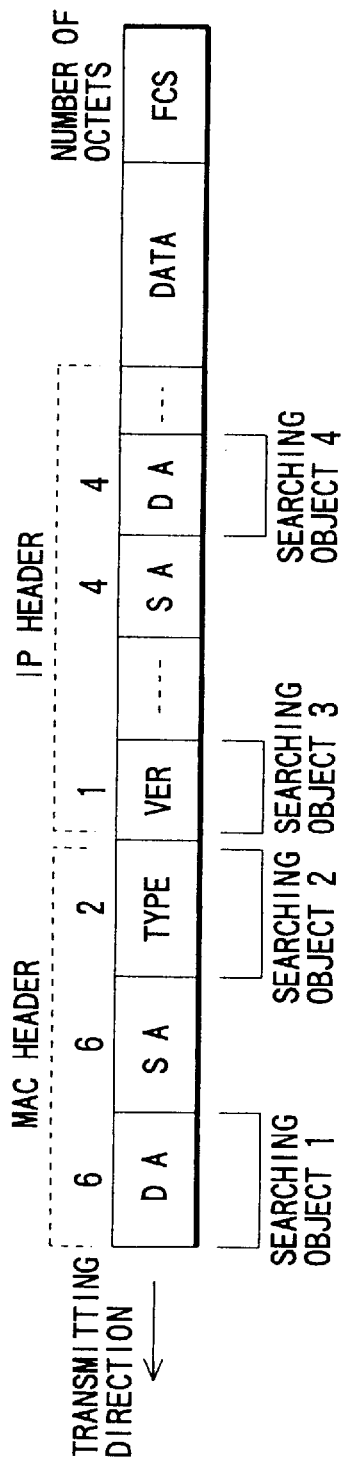
FIG. 2 is a view showing a format of a frame.
Figure 3:
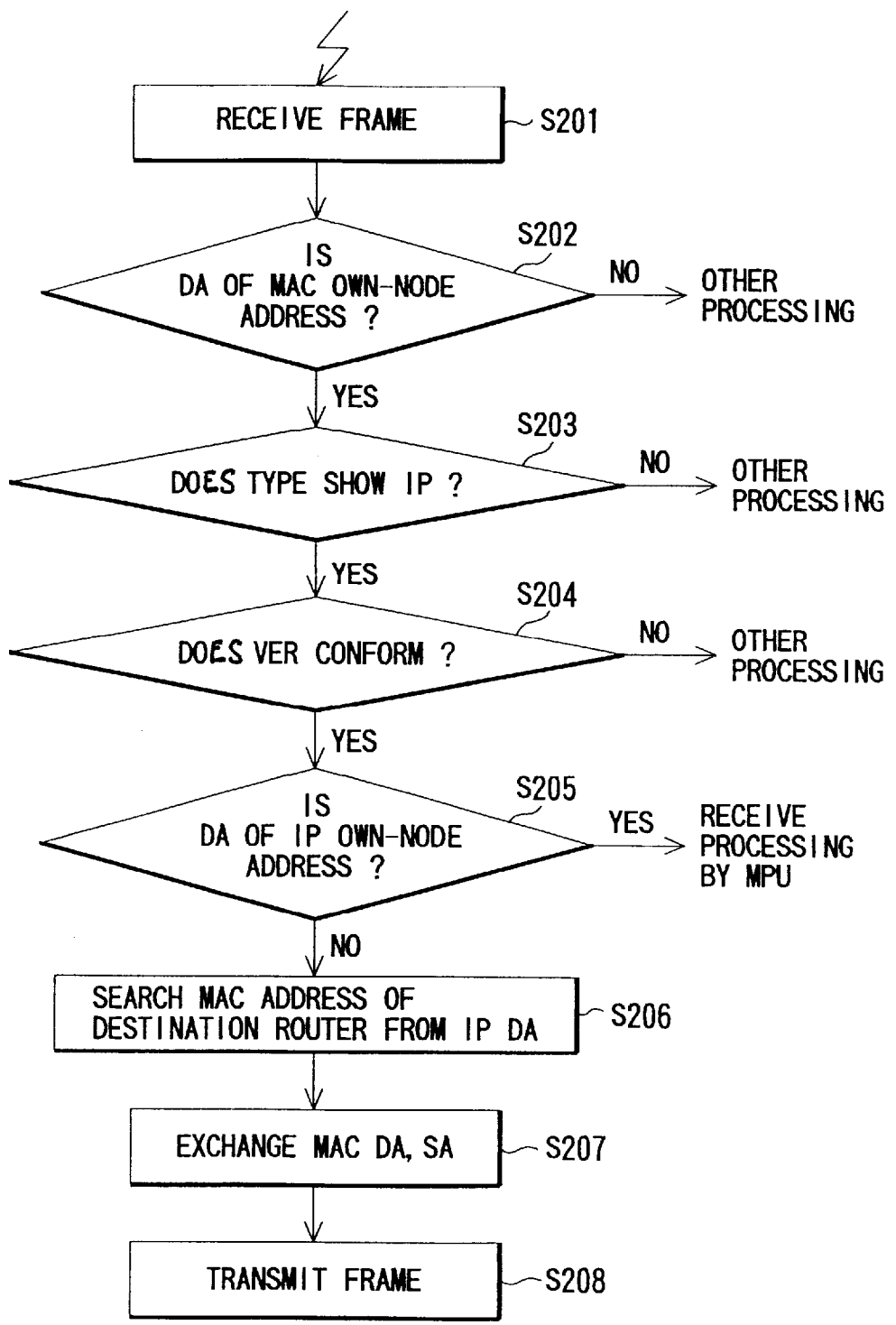
FIG. 3 is a flow chart showing an MPU processing.

FIG. 4 is a view showing a network connection device of an embodiment of the present invention. In this figure, a network connection device B comprises a microprocessor unit (MPU) 11, a local memory 12, a frame exchanging processor 13, LAN/WAN controllers 15-1 to 15-n, and a frame buffer memory 17.

Each of LAN/WAN 16-1 to 16-n is connected to a system bus 18 through each of LAN/WAN controllers 15-1 to 15-n.

The frame exchanging processor 13 is connected to the system bus 18 to execute a frame exchange processing of the frames stored in the frame buffer memory 17. Also, the system bus 18 is connected to a local bus 14. Then, MPU 11, the local memory 12, and the frame exchanging processor 13 are connected to the local bus 14.

The frames coming from the LAN/WAN controllers 16-1 to 16-n are temporarily stored in the frame buffer memory 17. The frames stored in the frame buffer memory 17 are further read to be transmitted to LAN/WAN 16-1 to 16-n.

MPU 1, which is connected to the local bus 4, receives and transmits routing data from/to the other network connection device by use of a program or data of the local memory 12, which is also connected to the local bus 4.

MPU 11 sets up data, which is necessary to the frame exchanging processor 13. Normally, MPU 11 does not execute the exchange control of the frame stored in the frame buffer memory 17, excepting the special case.

Figure 5:
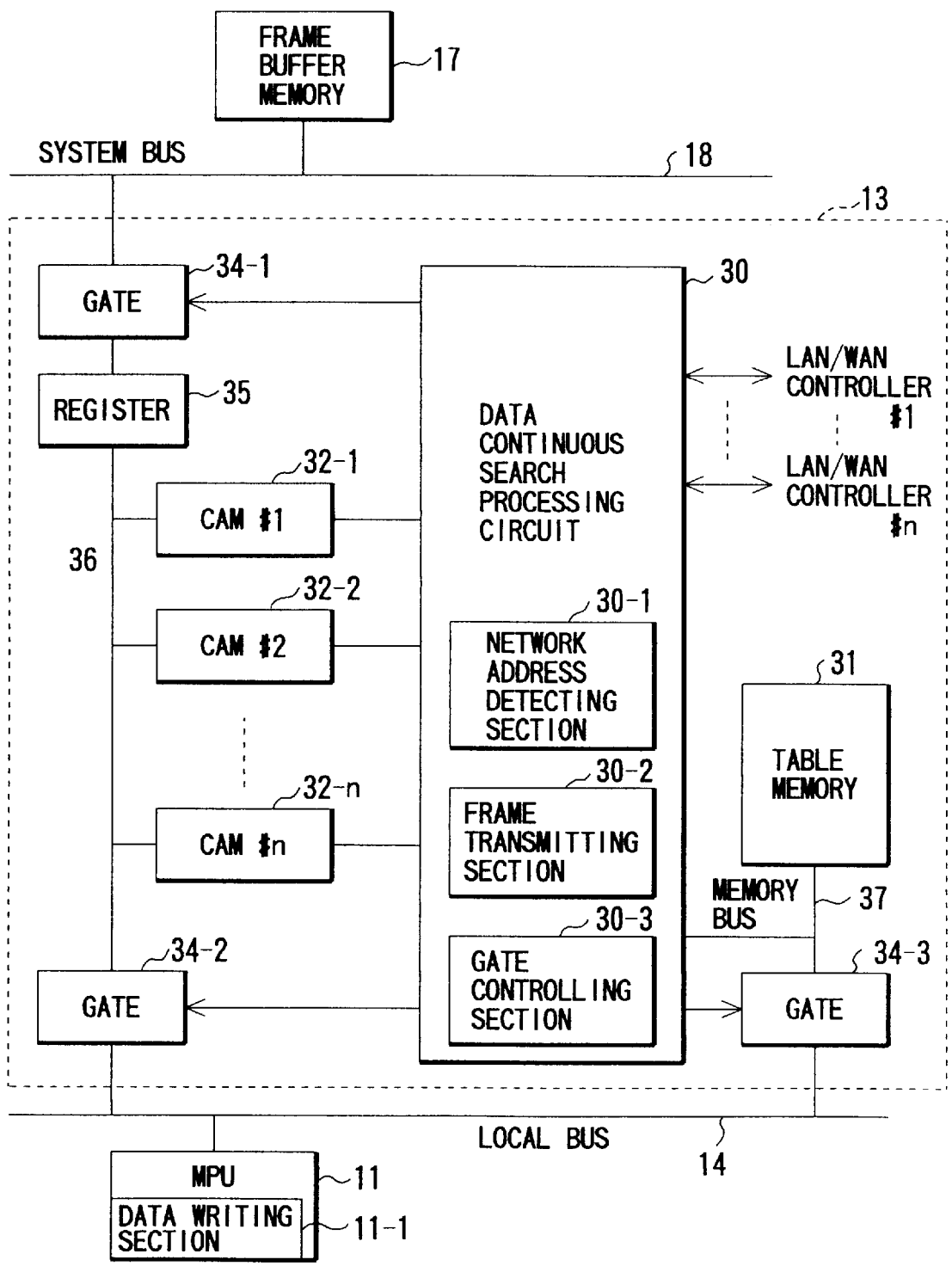
FIG. 5 is a view showing a frame exchanging processor of the network device of FIG. 4.

FIG. 5 is a view showing a frame exchanging processor of the network device of FIG. 4.

The frame exchanging processor 13 comprises a data continuous search processing circuit 30, content addressable memories (CAM) 32-1 to 32-n, and a table memory 31. The data continuous search processing circuit 30 is connected to the system bus 18. The CAMs 32-1 to 32-n are connected to the data continuous search processing circuit 30. The table memory 31 stores data of the other CAMs to be searched next and an address of the network when a data item, which is stored in CAMs 32-1 to 32-n, a data item, which is stored in the frame buffer memory 17, are conformed to each other in the comparison.

A register 35 is provided between the system bus 18 and CAMs 32-1 to 32-n. The register 35 temporarily stores data to be set in CAMs 32-1 to 32-n.

The data continuous search processing circuit 30 and the table memory 31 are connected by a memory bus 37. Gates 34-1, 34-2, and 34-3 are provided between the system bus 18 and the register 35, between the local bus 14 and CAMs 32-1 to 32-n, and between the local bus 14 and the table memory 31, respectively.

The data continuous search processing circuit 30 controls the gates 34-1, 34-2, 34-3 based on a request from MPU 11, thereby controlling an access to CAMs 32-1 to 32-n by the data continuous search processing circuit 30, an access to CAMs 32-1 to 32n by MPU 11, and an access to the table memory 31.

Figure 6:
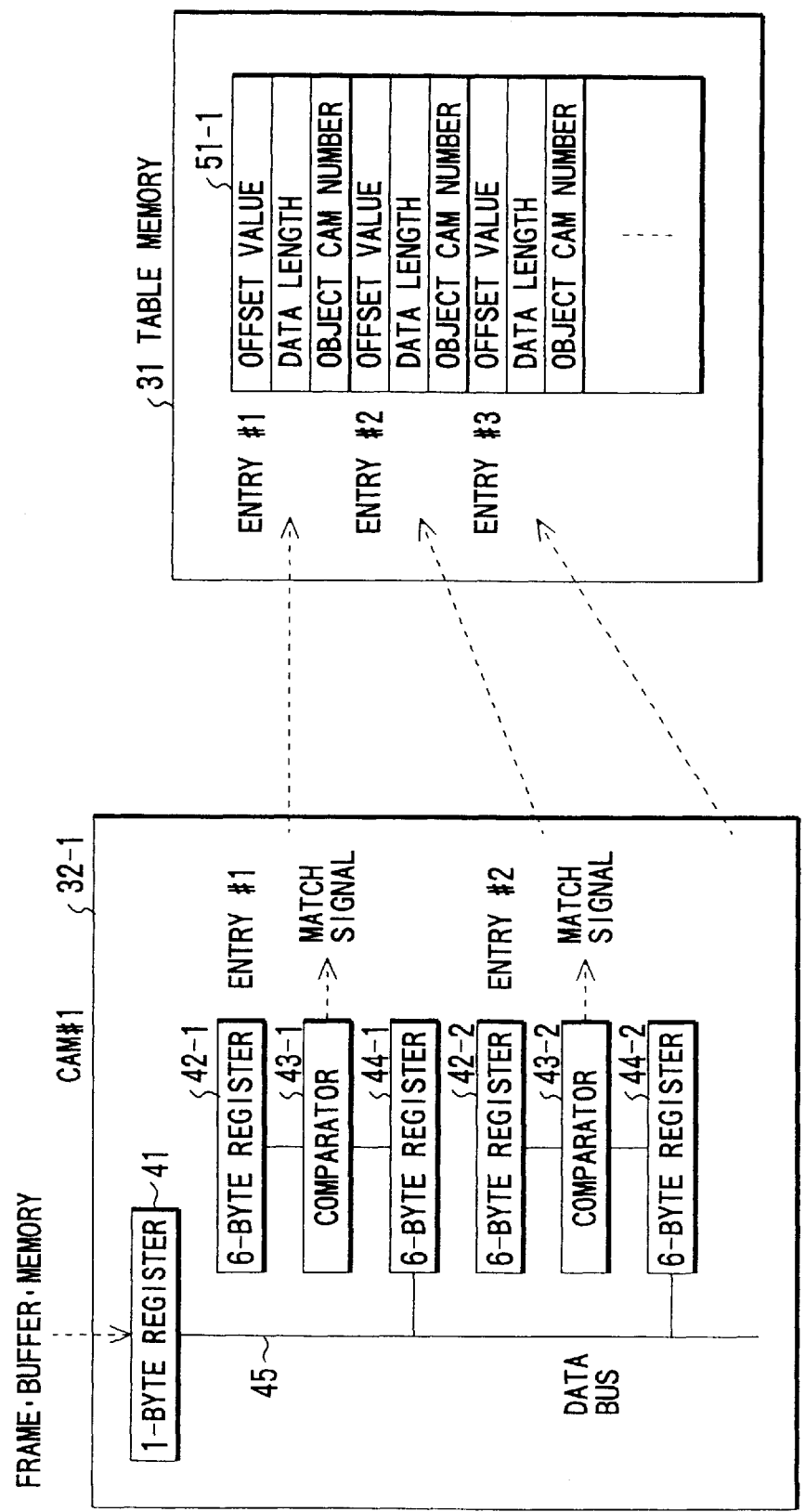
FIG. 6 is a view showing a table for storing data of the other CAM of the memory for table.

FIG. 6 shows the table memory 31 having CAM 32-1 and a table 51-1 for storing data of the other CAMs to be searched next. In this figure, though, only the structure of CAM 32-1 is shown, the same structure can be used in the other CAMs 32-2 to 32-n.

In CAM 32-1, a one-byte register 41, six-byte registers 44-1, 44-2, ..., and six-byte registers 42-1, 42-2, ..., and comparators 43-1, 43-2, ... are provided. The one-byte register 41 temporarily stores data coming from the frame buffer memory 17 through the gate 34-1, the register 35. The six-byte registers 44-1, 44-2, ... are connected to the one-byte register 41 through a data bus 45. In the six-byte registers 44-1, 44-2, ..., comparing data is set. In the six-byte registers 42-1, 42-2, ..., comparing data is stored in advance. The comparators 43-1, 43-2 ... compare data set in the six-byte registers 44-1, 44-2, ..., with data stored in the six-byte registers 42-1, 42-2, ... in advance.

When the comparison results conform to each other, each of comparators 43-1, 43-2, ... outputs a "match signal" to the data continuous search processor 30. In the table 51-1 of the table memory 31, an "offset value", which shows a position (byte) from the head of the frame, and a "data length", which shows a length (byte) of data from the position shown by the offset value, and an "object CAM number", which shows a CAM number to be searched next, are set at every entry.

FIG. 7 is a view showing the structure of the table memory 31 having CAM 32-10 and a table 51-m for storing data showing addresses of the network.

The structure of CAM 32-10 is the same as that of CAM 32-1 shown in FIG. 6. In this case, in the table 51-m, a "network address", a "MAC address of router", a "MAC address of the own-node", and a "port number" are set at every entry. Moreover, the same table may be used as the table 51-1 of FIG. 6 and the table 51-m of FIG. 7.

The following will explain an operation of the frame exchanging processor of the above-mentioned network connection device with reference to the flow chart of FIG. 8.

If each of LAN/WAN controllers 15-1 to 15-n receives the frame transmitted from the corresponding LAN/WAN 16-1 to 16-n, the frame is stored in the frame buffer memory 17. Then, the reception of the frame is sent to the data continuous search circuit 30 of the frame exchanging processor 13.

FIG. 9 is a view showing the frame stored in the frame buffer memory 17.

As shown in FIG. 9, the frame has a MAC header, a IP header, data (DATA), and a frame check sequence (FCS).

The MAC header has a 6-byte destination address (DA), a 6-byte sender address SA, and a 2-byte protocol (Type). The IP header has a one-byte version (VER) including header length, a 4-byte sender address (SA), and a 4-byte destination address (DA).

If a reception of the frame is notified from any of LAN/WAN controllers 15-1 to 15-n, the data continuous search processing circuit 30 detects the reception of the frame (S101). The data continuous search processing circuit 30 opens the gate 34-1, and closes the gates 34-2 and 34-3 by the gate controller 30-3.

Then, the data continuous search processing circuit 30 reads data corresponding to 6 bytes from the head address of the frame stored in the frame buffer memory 17. In other words, the destination address (DA) of MC header is read to be set to the register 35. Then, the destination address (DA) set to the register 35 is written to the CAMs 32-1 to 32-n (S102).

It is determined by the content of data set in the CAMs 32-1 to 32-n to which CAM the destination address (DA) is written. In this case, the CAM 32 is determined every system. As shown in FIG. 6, in the CAM 32 in which data is written, the comparators 43-1 and 43-2 compare data stored in the 6-byte registers 44-1 and 44-2 and data stored in the 6-byte registers 42-1 and 42-2 in advance, respectively. If the comparison results are conformed to each other, the match signal is output to the data continuous processing circuit 30 from each of the comparators.

The match signal includes the corresponding entry number of CMA. That is, the match signal corresponds to one entry of on table of the table memory 31.

The data continuous processing circuit 30 fetches the content from the corresponding entry of the table 51-1 of the table memory 31 to correspond to the match signal (S103). As a result, an address of an "head address"+an "offset address" is obtained.

Then, the data continuous processing circuit 30 read data, corresponding to a "data length", from the address and writes read data to CAM 32 shown by "object CAM number (a plurality of object CAM numbers can be set)" (S104).

Thereafter, the data continuous processing circuit 30 detects whether or not MAC address is set in the table, which corresponds to the match signal, as set in the table 51-m of FIG. 7 (S105). If MAC address is set, the operation goes back to step S103.

Figure 10:
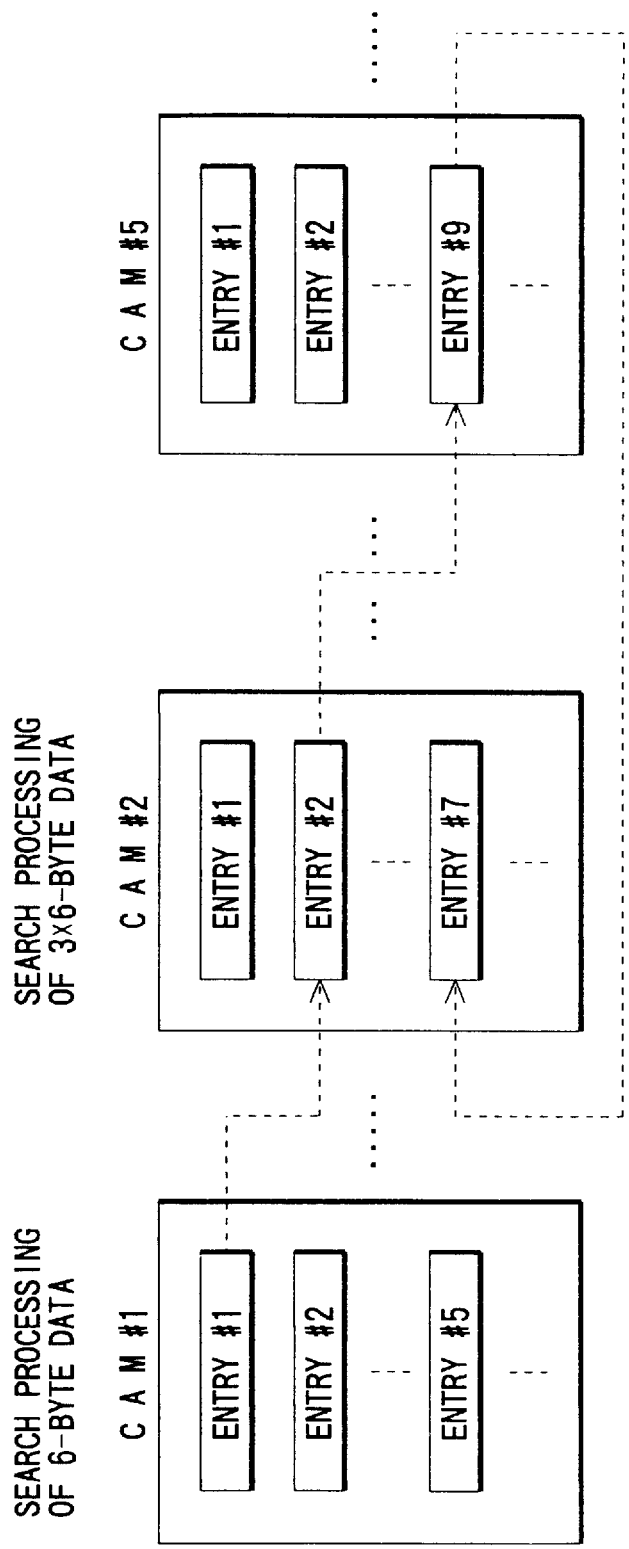
FIG. 10 is a view showing a continuous search processing.

The following will explain a state in which the continuous search processing is executed based on data, which is set in CAM 32 in advance, with reference to FIG. 10.

In this figure, first 6-byte data is conformed to data stored in the 6-byte register in advance at entry #1 of CAM #1. Next, designated three data (3×6 bytes) is conformed to data stored in the 6-byte register in advance at entry #2 of CAM #2. Moreover, data, which is designated based on data of entry #2 of CAM#2, is conformed to data stored in the 6-byte register in advance at entry #9 of CAM#5.

Then, data, which is designated based on data of entry #9 of CAM #5, is conformed to data stored in the 6-byte register in advance at entry #7 of the last CAM #2. After, the comparison of the data using the CAM is continued similarly, finally table which MAC address is registered is obtained.

Thus, regarding data of the frame input from the network, the operation for obtaining the address of the network using CAM and the table memory 31 is executed by the network address detector 30-1 of the data continuous search processing circuit 30.

In the 6-byte register 42 of CAM, 6-byte data may not be always stored. Data less than 6 bytes may be stored in the register 42.

If the MAC address is obtained, the operation goes to step S106 from step S105. In step S106, "network address, MAC address of router, MAC address of own-node and transmission port number", are read. These addresses show the content of the entry of the table 51-m of the table memory 31, which corresponds to the entry number conformed in CAM 32.

Then, the network address is used to check the final destination address. The data continuous search processing circuit 30 replaces the destination address DA of the MAC header of the frame read from the frame buffer memory 17 and the sender address SA with the MAC address of the router of the table and the MAC address of the own-node, respectively. Then, the replaced addresses are stored in the frame buffer memory 17 (S107).

Moreover, the data continuous search processing circuit 30 designates the LAN/WAN controller 5, which corresponds to "port number" of the table, to transmit the frame. Specifically, the frame transmission section 30-2 of the circuit 30 designates the transmission of the frame.

As a result, one of the LAN/WAN controllers 5-1 to 5-n takes up the frame from the frame buffer memory 17, so that the taken up frame is transmitted to the corresponding LAN/WAN (S108).

Thus, the data continuous search processing circuit 30 comprises the frame transmission section 30-2. Specifically, if the address of the network is obtained by the network address detector 30-1, the frame transmission section 30-2 sets the obtained address in place of the address of the frame. Then, the frame transmission section 30-2 designates one of the LAN/WAN controllers 5-1 to 5-n to transmit the frame. The designated LAN/WAN controller 5 transmits the frame to the network corresponding to the obtained address.

In the above-mentioned operation, the gate control section 30-3 of the circuit 30 opens the gate 34-1 and closes the gates 34-2 and 34-3.

For updating data set in CAMs 32-1 to 32-n in advance or data of the table memory 31, MPU 11 notifies the update of data to the data continuous search processing circuit 30.

For example, in case of updating data set in CAMs 32-1 to 32-n in advance, the gate control section 30-3 of the circuit 30 closes the gates 34-1 and 34-3 and opens the gate 34-2. In this case, MPU 11 updates (sets up) data of CAM 32-1 to 32-n.

In case of updating data of the table memory 31, the gate control section 30-3 of the circuit 30 closes the gates 34-1 and 34-2 and opens the gate 34-3. In this case, MPU 11 updates (sets up) data of the table memory 31.

More specifically, data of the CAMs 32-1 to 32-n or data of the table memory 31 is updated (set up) by a data writing section 11-1 included in the MPU 11.

According to the network connection device of the above-explained embodiment of the present invention, each of CAM 32-1 to 32-n includes the plurality of comparators, and these comparators perform comparison simultaneously. As a result, the high speed processing can be executed. In the above embodiment, the plurality of CAMs was provided. However, the number of CAMs may be one.

According to the network connection device of the present invention, the plurality of data stored in advance and data of the frame sent from the network are simultaneously compared by the CAM, so that the processing speed can be improved with relatively simple structure.

Moreover, the address of the network can be obtained by continuously accessing to the CAM based on data given by the table memory, so that the processing speed can be improved and total capacity of CAM can be reduced.

Furthermore, in data of the other CAMs stored in the memory table, there are included data of which portion of the frame should be read and identification data of the content addressable memory to be accessed next. As a result, it is possible to obtain data of the frame to be sent to the corresponding network based on the necessary portion.

Moreover, according to the present invention, data of the content addressable memory and data of the table memory can be written. As a result, even if the trouble of the network and the replacement of the structure occur, it is possible to update data of the content addressable memory and the content of the table memory so as to deal with such the trouble and the replacement.

Furthermore, since the respective gates 34-1 to 34-3 are controlled by the gate control section 30-3, time for updating and searching data of the content addressable memory and the content of the table memory can be suitably switched, so that the appropriate operation can be ensured.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A network connection device comprising:
    a plurality of checking means, each having predetermined data stored in each of a plurality of entries in advance, for checking whether or not said predetermined data of each entry corresponds to data of a frame transmitted from a sender network;
    storing means, provided to correspond to each entry of said checking means, for storing data indicating other checking means to be searched next and an address of a destination network;
    address obtaining means for obtaining the address of the destination network of the frame from the sender network by use of the data and the address stored in said storing means and said checking means when said checking means checks that said predetermined data corresponds to the data of the frame from the sender network;
    setting means for setting the address of the frame from the sender network in place of the address of the destination network obtained by said address obtaining means when said address obtaining means obtains the address of the destination network; and
    transmitting means for transmitting the frame having the address of the destination network set by said setting means to the sender network.

2. The device according to claim 1, wherein said address obtaining means continuously accesses said checking means based on the data being stored in said storing means and indicating the other checking means to be searched next, so that said address obtaining means obtains the address of the destination network stored in said storing means.

3. The device according to claim 1, wherein said data, being stored in said storing means and indicating the other checking means to be searched next, comprises data showing which part of the frame from said sender network should be read, and identification data of the other checking means to be searched next.

4. The device according to claim 2, wherein said data, being stored in said storing means and indicating the other checking means to be searched next, comprises data showing which part of the frame from said sender network should be read, and identification data of the other checking means to be searched next.

5. The device according to claim 1, further comprising:
    updating means for updating said predetermined data stored in said checking means in advance.

6. The device according to claim 1, further comprising:
    updating means for updating the data indicating the other checking means to be searched being stored in said storing means.

7. The device according to claim 1, further comprising:
    updating means for updating the address of the destination network stored in said storing means.

8. The device according to claim 5, wherein said updating means comprises writing means for writing data to said checking means, and determining means for determining whether or not the data writing to said checking means by said writing means is allowed.

9. The device according to claim 6, wherein said updating means comprises writing means for writing data to said checking means, and determining means for determining whether or not the data writing to said checking means by said writing means is allowed.

10. The device according to claim 7, wherein said updating means comprises writing means for writing the address of the destination network to said storing means, and determining means for determining whether or not the address writing to said storing means by said writing means is allowed.

\* \* \* \* \*